Nov. 29, 1949 C. N. BEBINGER ET AL 2,489,258
FLUID PRESSURE ACTUATED CLUTCH
Filed Oct. 26, 1944 2 Sheets-Sheet 1
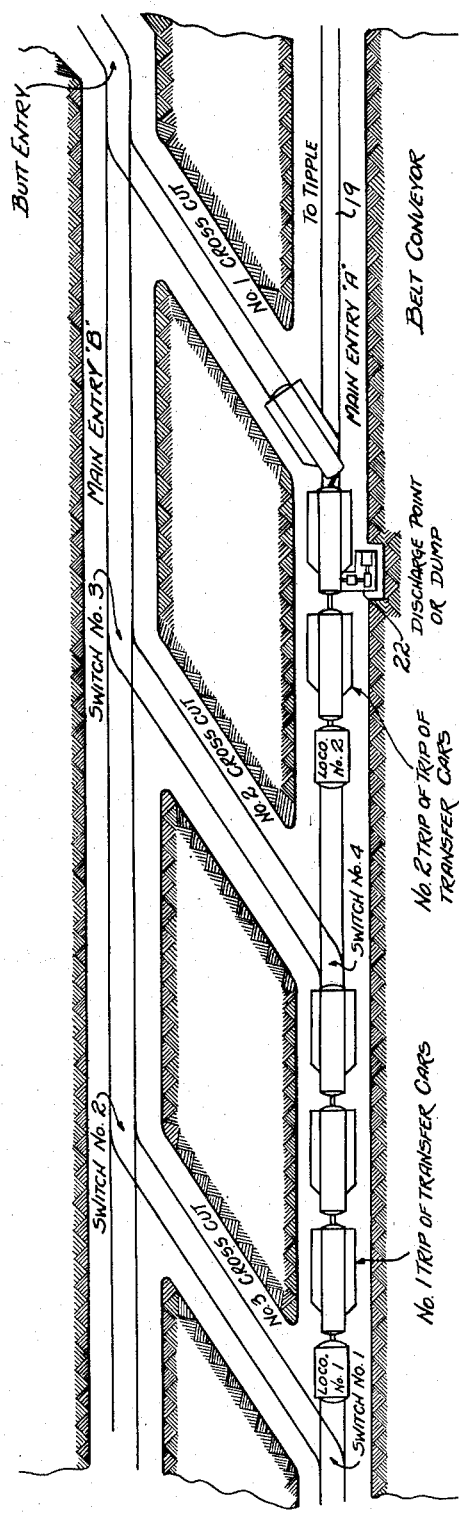
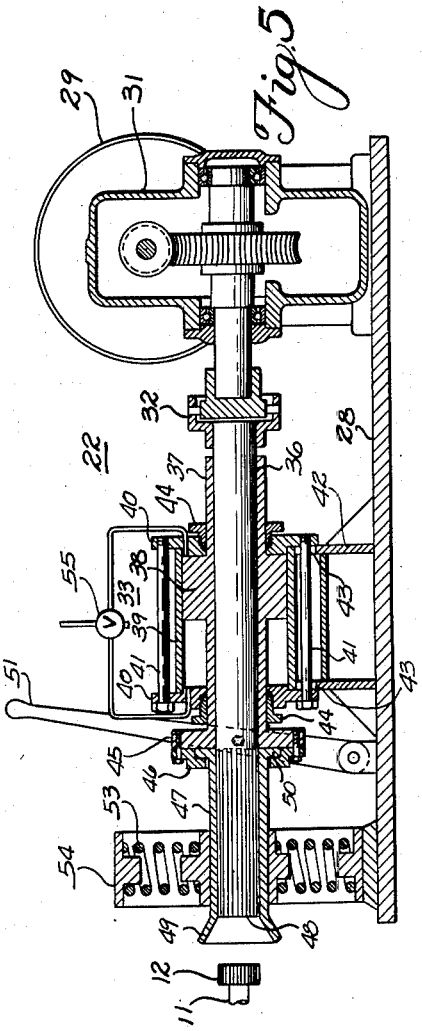
INVENTORS
Charles N. Bebinger
BY Arden T. Jones.
Stoodling and Kost
attys

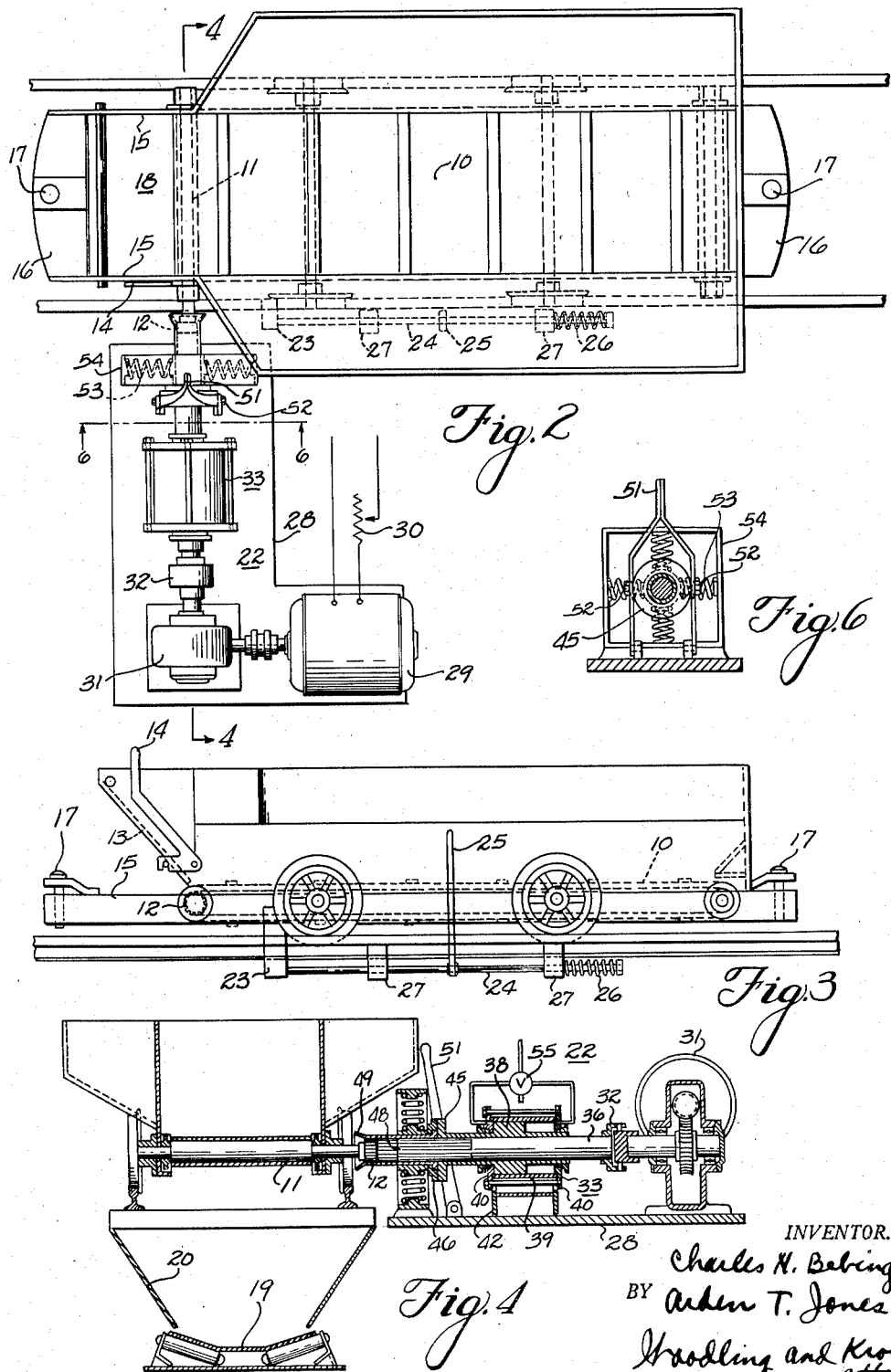

Patented Nov. 29, 1949

2,489,258

UNITED STATES PATENT OFFICE 2,489,258

FLUID PRESSURE ACTUATED CLUTCH

Charles N. Bebinger and Arden T. Jones, New Philadelphia, Ohio, assignors, by mesne assignments, to Joy Manufacturing Company, a corporation of Pennsylvania Application October 26, 1944, Serial No. 560,482

11 Claims. (Cl. 192—86)

The invention relates in general to power driving units and more particularly to power driving units for unloading transfer cars.

An object of the invention is the provision of a power driving unit which is adapted to be located adjacent the side of a transfer car, in which the power driving unit has an extensible power driven shaft which is adapted to be extended to engage a shaft on the transfer car which drives the unloading conveyor of the transfer car.

Another object of the invention is the provision of resiliently supporting the extensible power driven shaft so that it may be easily and readily connected to the conveyor shaft for unloading the transfer car.

Another object of the invention is the provision of resiliently supporting the extensible power driven shaft of the power driving unit so that the extensible shaft may be shifted or moved about so as to be easily and readily connectable to the shaft of the unloading conveyor, whereby the "spotting" of the transfer car for unloading purposes may be varied within a limited range afforded by the accommodation of the shifting of the extensible power driven shaft which is resiliently mounted.

Another object of the invention is the provision of fluid actuating means for axially operating the extensible shaft whereby it may be moved to either engage or disengage the unloading conveyor shaft of the transfer car.

Other objects and a fuller understanding of the invention may be had by referring to the following description and claims, taken in conjunction with the accompanying drawing, in which:

Figure 1 is a plan view of a mining layout illustrating the routing of transfer cars and showing a discharge point or dump, being the location where the power driving unit is located;

Figure 2 is a plan view of a transfer car and the power driving unit which is adapted to drive the unloading conveyor shaft of the transfer car;

Figure 3 is a side elevational view of the transfer car shown in a "spotted" position in readiness to be unloaded;

Figure 4 is a cross-sectional view taken along the line 4—4 of Figure 2;

Figure 5 is an enlarged view similar to Figure 4 and showing the detailed parts with more particularity; and Figure 6 is a cross-sectional view taken along the line 6—6 of Figure 2 and showing principally the resilient mounting for the extensible power driven shaft and the lever for extensibly actuating the power driven shaft.

With reference to Figure 1 of the drawing, it is to be observed that the mine layout illustrates two main entries designated as A and B, although it is to be understood that any number of main entries may be actually employed in commercial operation. The Figure 1 also shows two trips of transfer cars, namely, Numbers 1 and 2, but any number may be so employed in commercial practice. Trip No. 2 is over the discharge point or dump, and trip No. 1 is pulled ahead and the locomotive No. 1 will uncouple from the trip and will pull ahead past switch No. 1, reverse and come back through cross-cut No. 3 and thence to switch No. 2 into entry B on down past switch No. 3 at which point it will reverse, come back through cross-cut No. 2 through switch No. 4 and couple to the trip of empties left standing in entry A. The locomotive No. 1 will then proceed out through cross-cut No. 2 into entry B and on down this main entry until it comes to a butt entry which turns off to the left where it then proceeds to the place where the coal is being mined. The belt conveyor 19 which carries the coal to the tipple comes in on the main entry A. The power driven unit is shown at the dump and is arranged to unload each of the transfer cars whereby the coal falls into a hopper or dump pit 20. The belt conveyor 19 carries the coal from the dump pit 20 to the tipple of the mine. This system could be used with the dump serving five or six trips; in other words, the six trips (trip meaning locomotive and any number of transfer cars) would be shuttled back and forth between the discharge point or dump and the place where the coal is being mined.

As illustrated in Figures 2, 3 and 4, each of the transfer cars is provided with an unloading conveyor 10 which is driven by a conveyor shaft 11 having a gear 12 mounted on the end thereof which extends to the side of the frame of the transfer car. As illustrated, the conveyor shaft gear 12 is arranged to be driven by a power driving unit 22 which is disposed to the side of the conveyor car. The turning of the conveyor shaft 11 causes the coal or other material in the transfer car to be drawn backwards in the transfer car body and dumped into the dump pit 20. With the type of transfer car illustrated, the coal may be dumped into the dump pit 20 without disconnecting or uncoupling the car. This provision is made possible by extending the side frame members 15 of the car rearwardly and interconnecting the extended members 15 by a cross-frame member 16, thereby affording a dumping space indicated by the reference character 18 whereby the coal or other material may fall therethrough into the dump pit 20. The cross-frame member 16 carries a connecting pin 17 which is adapted to connect the next adjacent transfer car thereto. The rear end of the transfer car is provided with an end gate 13 which may be unlatched by moving a latch lever 14 in a forward direction. Upon the unlatching of the end gate 13, it swings backwardly and allows the coal to fall through the dumping space 18 into the dump pit 20.

Any suitable means may be employed for "spotting" the transfer car so as to be in the proper position for engagement by the power driving unit. As illustrated in Figures 2 and 3, there is shown a stop bumper 23 connected to the end of a slidable rod 24 which is slidably mounted in brackets 27 connected to the rails upon which the transfer car moves. A spring 26 which surrounds the rod 24 and which is positioned between the bracket 27 and a boss upon the end of the rod, may be employed to absorb the shock of the stop bumper as it is contacted by a wheel of the transfer car. A lever 25 is connected to the rod 24 which when the lever 25 is pulled laterally away from the transfer car, actuates the stop bumper 23 out of the path of the wheels of the transfer car whereby the trip of transfer cars may be moved until the next transfer car which is to be unloaded is brought into position for unloading where its wheel engages the stop bumper 23 after the lever 25 is restored to its normal stop position.

The power driving unit 22 comprises generally a base 28, an electric motor 29, a speed reducer 31, an extensible power shaft 36 and a fluid actuating device 33 for axially extending the extensible power shaft for making engagement with the gear 12 provided on the conveyor shaft 11 extending from one side of the transfer car. The electric motor 29 may be of any suitable type which may be controlled to give a variable speed such, for example, as by an adjustable resistor 30 or any other suitable electrical starting box connected between the supply line and the electric motor. The electric motor 29 is arranged to drive the speed reducer and the output shaft of the speed reducer is arranged to be connected to the extensible power shaft 36 by means of a coupling 32 which permits a limited amount of angular movement of said extensible power shaft. The power shaft 36 is provided with a splined end 48 which slidably fits in a splined sleeve 47 which when extended engages the gear 12 on the end of the conveyor shaft 11. The splined sleeve 47 is provided with a conical end 49 to facilitate the insertion of the splined sleeve 47 over the gear 12. Any suitable means may be employed to axially move the splined sleeve 47 upon the splined end 48 of the power shaft 36, and as illustrated, there is shown both a lever 51 and the fluid actuating device 33. As shown best in Figure 5, the fluid actuating device 33 comprises a piston sleeve 37 having a piston 38 provided thereon which reciprocally operates within a cylinder 39 having cylinder heads 40. The piston sleeve 37 reciprocally moves through packing glands 44 provided in the cylinder heads 40. Any suitable means may be employed to secure the cylinder heads 40 to the end of the cylinder 39, and as illustrated, there is provided connecting bolts 41 which extend from one end of the cylinder to the other. The fluid actuating device 33 is carried by the power shaft 36 but it is constrained against axial movement by means of a stand 42 which is provided with forked upright members 43 which straddle the lowermost connecting bolt 41 and which fit against the inside surfaces of the cylinder head 40. This mounting of the fluid actuating device permits a certain amount of lateral and/or vertical movement of the fluid actuated device 33.

The left-hand end of the piston sleeve 37 is provided with a flange 45 to which is fastened an annular bracket 46 to provide an annular internal groove to receive a flange 50 provided on the right-hand end of the splined sleeve 47. The flange 50 may rotatively move within the groove provided by the annular bracket 46 whereby the piston sleeve 37 does not rotate while the splined sleeve 47 is driven by the splined end 48 of the power shaft 36. Fluid under pressure may be delivered to opposite ends of the cylinder 39 by means of a valve 55. When fluid under pressure is applied to the right-hand end of the cylinder 39, the sleeve 37 actuates the splined sleeve 47 to the left to make engagement with the gear 12 on the conveyor shaft 11, and when fluid under pressure is applied to the left-hand end of the cylinder 39, the sleeves are actuated to the right for disengagement of the sleeve 47 from the gear 12 on the conveyor shaft 11. The splined sleeve 47 may also be actuated axially upon the splined end 48 of the power shaft by means of the lever 51 which is provided with forked members that straddle the flange 45 and the forked members are connected to opposite sides of the flange 45 by cap screws 52.

The splined sleeve 47 is resiliently supported by means of springs 53 mounted within a box frame 54 supported by the base 28. In the drawings, four springs are illustrated, which give resilient support in all radial directions. The springs provide a limited amount of shifting of the splined sleeve 47 in a radial direction whereby the "spotting" of the transfer car need not be in such a position as to give a perfect alignment between the splined sleeve 47 and the gear 12 on the conveyor shaft. That is to say, the springs accommodate a certain amount of misalignment between the splined sleeve 47 and the gear 12, the misalignment being made possible by "play" in the coupling 32. In other words, said coupling provides for a limited amount of angular adjustment or movement of said sleeve 47 and the shaft 36.

In operation, each of the transfer cars is stopped by means of the stop bumper 23, after which the operator either actuates the lever 51 or the valve 55 for applying pressure to the piston 38 within the fluid actuating device 33 for actuating the splined sleeve 47 over the gear 12 of the conveyor shaft. The motor 29 is then started and the speed thereof may be varied to control the rate at which the coal or other material is discharged into the dump pit 20. After the transfer car is completely emptied, the splined sleeve 47 is actuated from engagement with the gear 12 whereby another transfer car may be moved into position for emptying the material contained therein.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. A power driving device for driving a rotatively mounted shaft, said power driving device comprising a base, motive power means mounted on the base, driving connection means driven by the motive power means, said driving connection means comprising a power shaft driven by the motive power means and a sleeve non-rotatively mounted on the end of the power shaft for engaging the rotatively mounted shaft, and means for resiliently supporting the sleeve on the base.

2. A power driving device for driving a rotatively mounted member which is adapted to be brought, by movement transverse to its axis of rotation, into a position for drive by such power driving device, said power driving device comprising a base, motive power means mounted on said base and driving connection means supported by said base and driven by said motive power means and including extensible shaft means having a slidable portion engageable in driving relation with said rotatively mounted member and having a conical guide at its end to pass over said member and guide said slidable portion of said extensible shaft means into driving relation with said member in the event of imperfect alinement, means normally maintaining said slidable portion with its axis extending in a predetermined direction but yieldable under the coaction of said conical guide with said member to position said slidable portion for engagement in driving relation with said rotatively mounted member, and means on said base for moving said slidable portion endwise to establish such driving relation.

3. A power driving device for driving a rotatively mounted member which is adapted to be brought, by movement transverse to its axis of rotation, into a position for drive by such power driving device, said power driving device comprising a base, motive power means mounted on said base and driving connection means supported by said base and driven by said motive power means and including extensible shaft means having a slidable portion engageable in driving relation with said rotatively mounted member and having a conical guide at its end to pass over said member and guide said slidable portion of said extensible shaft means into driving relation with said member in the event of imperfect alinement, means normally maintaining said slidable portion with its axis extending in a predetermined direction but yieldable under the coaction of said conical guide with said member to position said slidable portion for engagement in driving relation with said rotatively mounted member, and fluid operated actuating means for moving said slidable portion endwise to establish and to interrupt such driving relation.

4. A power driving device for driving a rotatively mounted member, said power driving device comprising a base, motive power means mounted on the base, driving connection means supported by the base and driven by the motive power means, said driving connection means comprising a power shaft driven by the motive power means, said power shaft having a splined end, a first sleeve having a splined opening adapted to engage the splined end of the power shaft, said sleeve being slidably mounted to move in an axial direction on said power shaft, and being extensible beyond the end of the splined end of said power shaft to engage said rotatively mounted member, a second sleeve slidably mounted on said power shaft and between the motive power means and said first sleeve, said second sleeve being connected to said first sleeve, a piston connected to said second sleeve, a cylinder for said piston, means for securing the cylinder against axial movement, said cylinder and said piston constituting actuating means to slidably actuate the said sleeves, whereby driving engagement is effected between the first sleeve and the rotatively mounted member, and means to resiliently support the first sleeve and the splined end of the power shaft on the base.

5. A power driving device for driving a rotatively mounted member, said power driving device comprising a base, motive power means mounted on the base, driving connection means supported on the base and driven by the motive power means, said driving connection means comprising a power shaft driven by the motive power means, said power shaft having a splined end, a first sleeve having a splined opening adapted to engage the splined end of the power shaft, said first sleeve being slidably mounted to move in an axial direction on said power shaft and being extensible beyond the end of the splined end of said power shaft, a flared alignment portion on the end of said first sleeve to engage said rotatively mounted member, a piston having a central opening longitudinally therethrough, said piston being adapted to reciprocate upon said power shaft with the power shaft extending through said opening thereof, an interconnecting sleeve slidably mounted on said power shaft and interconnecting said piston and the first sleeve, a cylinder for said piston encompassing said power shaft and piston, means for securing the cylinder against axial movement, said cylinder and said piston constituting actuating means to slidably actuate the said first sleeve, and a resilient spring frame mounted on said base to resiliently support the first sleeve and the splined end of the power shaft on the base, whereby the flared sleeve end may drivingly align the driving connection means with said rotatively mounted member upon axial movement of the first sleeve by the actuating means.

6. A power driving device for driving a rotatively mounted member, comprising motive power means and driving connecting means adapted to disengageably interconnect said rotatively mounted member and the motive power means, said driving connecting means including an axially extensible shaft, means drivingly interconnecting one end of said extensible shaft and said motive power means providing for a limited amount of angular adjustment of said shaft, conical alignment means on the other end of said extensible shaft, resilient support means for said driving connecting means, and means to extend said extensible shaft into driving engagement with said rotatively mounted member, the said conical alignment means being adapted to urge the extensible shaft to adjust itself at said drivingly interconnecting means into driving alignment with said rotatively mounted member, the shaft thereby being extendable into driving engagement with said member.

7. A power driving device for driving a rotatively mounted shaft, said power driving device comprising a base, motive power means mounted on said base, driving connection means driven by said motive power means and comprising a power shaft driven by said motive power means, a member for establishing a driving connection between said power shaft and the rotatively mounted shaft, and means including a sliding driving connection in said driving connection means providing for driving connection effecting movement between said member and the rotatively mounted shaft, and means for resiliently supporting said member on the base.

8. A power driving device for driving a rotatively mounted shaft, said power driving device comprising a base, motive power means mounted on said base, driving connection means driven by said motive power means, said driving connection means comprising a power shaft driven by said motive power means and a member non-rotatively but relatively slidably connected with said power shaft in supported relation to the latter and having means for effecting a driving connection with the rotatively mounted shaft, and means for resiliently supporting said member on said base.

9. A power driving device for driving a rotatively mounted member which is adapted to be brought, by movement transverse to its axis of rotation, into a position to be driven by such power driving device, said power driving device comprising a base, motive power means mounted on the base, driving connection means supported by the base and driven by the motive power means, said driving connection means comprising extensible shaft means having a slidable portion mounted for a limited range of movement transverse to its direction of sliding movement, actuating means interconnecting the base and the slidable portion for slidably actuating the slidable portion relative to the rotatively mounted member, and conical alignment effecting means on the end of the slidable portion adapted to guide the driving connecting means into driving engagement with said rotatively mounted member.

10. A power driving device for driving a rotatively mounted member which is adapted to be brought, by movement transverse to its axis of rotation, into a position to be driven by such power driving device, said power driving device comprising a base, motive power means mounted on the base, driving connection means supported by the base and driven by the motive power means, said driving connection means comprising extensible shaft means having a slidable portion mounted for a limited range of movement transverse to its direction of sliding movement, fluid actuating means for slidably actuating the slidable portion relative to the rotatively mounted member, and conical alignment effecting means on the end of the slidable portion adapted to guide the driving connecting means into driving engagement with said rotatively mounted member.

11. A power driving device for driving a rotatively mounted member which is adapted to be brought, by movement transverse to its axis of rotation, into a position for drive by such power driving device, said power driving device comprising a base, motive power means mounted on said base and driving connection means supported by said base and driven by said motive power means and including extensible shaft means having a slidable portion engageable in driving relation with said rotatively mounted member, means normally maintaining said slidable portion with its axis extending in a predetermined direction but yieldable to permit positioning of said slidable portion for engagement in driving relation with said rotatively mounted member, means on said base for moving said slidable portion endwise to establish such driving relation, and flared guiding means carried by one of the same for guiding the slidable portion of said shaft means into driving relation with said rotatively mounted member in the event of imperfect alinement when the latter is brought into a position for drive.

CHARLES N. BEBINGER.
ARDEN T. JONES.

REFERENCES CITED

The following references are of record in the file of this patent:

UNITED STATES PATENTS

| Number | Name | Date |
| --- | --- | --- |
| 244,717 | Dill | July 19, 1881 |
| 947,962 | Butler | Feb. 1, 1910 |
| 1,135,073 | Swarner | Apr. 13, 1915 |
| 1,197,802 | De Laney | Sept. 12, 1916 |
| 1,440,341 | Crispen | Dec. 26, 1922 |
| 1,480,021 | Smith | Jan. 8, 1924 |
| 1,490,404 | Ronning et al. | Apr. 15, 1924 |
| 1,673,466 | Mason | June 12, 1928 |
| 1,867,508 | Huber | July 12, 1932 |
| 2,355,226 | Mallory | Aug. 8, 1944 |
| 2,356,598 | Lang et al. | Aug. 22, 1944 |

FOREIGN PATENTS

| Number | Country | Date |
| --- | --- | --- |
| 324,297 | Germany | Aug. 26, 1920 |